United States Patent [19]
Hangai et al.

[11] Patent Number: 4,926,405
[45] Date of Patent: May 15, 1990

[54] HIGH-SPEED SEARCH METHOD FOR USE IN A DISC PLAYER SYSTEM

[75] Inventors: Toshimasa Hangai; Kiyoshi Tateishi; Koichi Ishitoya; Haruyasu Sakata, all of Tokorozawa, Japan

[73] Assignee: Pioneer Electronic Corporation, Tokyo, Japan

[21] Appl. No.: 240,628

[22] Filed: Sep. 6, 1988

[30] Foreign Application Priority Data

| Sep. 8, 1987 | [JP] | Japan | 62-224962 |
| Sep. 8, 1987 | [JP] | Japan | 62-224964 |
| Sep. 18, 1987 | [JP] | Japan | 62-234179 |
| Sep. 18, 1987 | [JP] | Japan | 62-234180 |
| Sep. 18, 1987 | [JP] | Japan | 62-234181 |

[51] Int. Cl.$^5$ .................................................. G11B 7/00
[52] U.S. Cl. ................................ 369/32; 369/44.11; 369/57; 360/78.06
[58] Field of Search ............... 360/78.01, 78.04, 78.06, 360/10.1, 10.2; 369/32, 43–47, 53–57

[56] References Cited
U.S. PATENT DOCUMENTS 4,835,753  5/1989  Yasuda .................................. 369/32

*Primary Examiner*—Robert L. Richardson
*Attorney, Agent, or Firm*—Fleit, Jacobson, Cohn, Price, Holman & Stern

[57] ABSTRACT

A high-speed search method for searching a target address and for use in a disc player system having a slider for positioning a pickup for reading an information signal recorded on a disc as tracks, in a disc radius, and a tracking servo system for causing an information detecting point of the pickup to follow the track. An accelerating-and-decelerating move control mode in which the slider is accelerated and subsequently decelerated with the tracking servo loop open, and a constant speed move control mode in which the slider is moved at a constant speed by using address data obtained from a signal from the pickup are prepared, and a distance from a present position of the pickup to the target address is detected. Operations of the accelerating-and-decelerating move control mode and subsequently the constant speed move control mode are executed and the tracking servo loop is closed when the distance is equal to or greater than a predetermined value, whereas the operation of the constant speed move control mode is executed without executing the operation of the accelerating-and-decelerating move control mode and the tracking servo loop is closed when the distance is smaller than the predetermined value.

11 Claims, 15 Drawing Sheets

INERTIAL FORCE

DIRECTION OF ACCELERATION

SELF-RESONANCE CHARACTERISTIC

30 Hz

ACCELERATION FACTOR

FREQUENCY

FIG. 12A VOLTAGE OUTPUT

FIG. 12B JUMP SIGNAL

FIG. 12C JUMP SIGNAL

HIGH-SPEED SEARCH METHOD FOR USE IN A DISC PLAYER SYSTEM

BACKGROUND OF THE INVENTION

1. Field of the Invention

The present invention relates to a search method for searching a target address on a disc loaded in a disc player system.

2. Description of Background Information

Disc player systems for playing an information recording disc (simply referred to as a disc) on which an information signal such as the video format signal or the audio signal is recorded with address data in a track form, a pickup for retrieving the information signal from the track is carried by a slider which is movable in a direction of a disc radius. In those disc players, address data, such as the frame number, the block number, the chapter number, and playing time from a standard point to the pickup position on the track, i.e. the positional information, is read out and a comparison is performed between the present address of the data block under playing and a target address of a target data block from which the playing is to be started.

As an example of the method of searching address data, a method is disclosed in Japanese Patent Application Laid Open No. 58-62868. In this conventional method, the pickup is moved to the vicinity of a target address by the so-called scanning operation while the speed of movement of the slider in radial direction, i.e., the scanning speed, is adjusted in accordance with comparison between the address data obtained from the pickup and data of the target address.

In the case of the above-described conventional method of searching address data, it is necessary that the scanning speed is lower than a speed at which the address data can be read in order, and the time required for searching becomes long when the difference between the present address and the target address is large. Hence, random access operations were not always performed rapidly with this conventional method.

On the other hand, when the slider is moved at high speeds, the inertial force of the slider increases. As a result, in the case of a slider having a low frictional resistance such as a slider using a linear motor, the slider does not stop immediately when a driving output to a slider motor is stopped or when a braking force is applied to the slider. This is inconvenient since the slider will stop at a position beyond the target address.

OBJECT AND SUMMARY OF THE INVENTION

An object of the present invention is therefore to provide a high-speed search method for use in a disk player system by which rapid random-access operations are enabled.

Another object of the present invention is to provide a high-speed search method by which the slider is prevented from overrunning without the necessity of reducing the slider speed.

In order to attain the above object, a high-speed search method according to the present invention is adapted for use in a disc player having a slider for positioning in a direction of disc radius a pickup for reading an information signal recorded on a disc in the track form and a tracking servo system for controlling an information reading point of the pickup to follow the track, and in which an accelerating-and-decelerating move control mode in which the tracking servo loop is opened and the slider is once accelerated and then decelerated, and a constant-speed move control mode in which the slider is moved at a constant speed by using address data obtained from a signal from the pickup are prepared. Moreover, a distance from the present position of the pickup to the target address is detected, and when the distance is larger than a predetermined value the tracking servo loop is closed after executing operations of the accelerating-and-decelerating move control mode and the constant-speed mode subsequently. When the distance is smaller than the predetermined value, the tracking servo loop is closed after executing the operation of the constant-speed move control mode without executing the operation of the accelerating-and-decelerating move control.

According to anther aspect of the invention, a high-speed search method for searching a target address is adapted for use in a disc player system having a slider for positioning a pickup for reading an information signal recorded on a disc as tracks, in a disc radius, and a tracking servo system for causing an information detecting point of the above mentioned pickup to follow the track, and the method comprises a first step for detecting an initial track on which the pickup is located, a second step for setting a temporary target track which is nearer to a present track than a final target track carrying target address data by a predetermined number of tracks for convergence from the above mentioned initial track, a third step for opening a servo loop of the above mentioned tracking servo system and accelerating the slider toward the above mentioned temporary target track, a fourth step for calculating the number of remaining tracks up to above mentioned temporary target track by using the number of traversed tracks obtained by counting tracks traversed by the pickup, a fifth step for estimating a change in the speed when the above mentioned slider travels across the above mentioned remaining tracks with a decelerating movement, and applying a braking force to the above mentioned slider to cause the decelerating movement so that it falls in a desired manner of speed change, a sixth step for stopping the above mentioned application of the braking force to the slider to cause a constant speed movement of the slider when the above mentioned number of the remaining tracks falls below a predetermined value or when the above mentioned speed of the pickup is reduced to be lower than a predetermined speed, a seventh step for reading address data at a present position of the above mentioned slider and thereby correcting the above mentioned number of traversed tracks, and an eighth step for stopping the above mentioned movement of the slider and closing the loop of the above mentioned tracking servo system when a difference between the corrected number of traversed tracks and the above mentioned final target track becomes smaller than a predetermined value.

According to still another aspect of the invention, in addition to the above mentioned first to eighth steps, the method is provided with a ninth step for causing the slider to perform jump operations until the address data obtained from the above mentioned pickup becomes identical with the above mentioned target address.

According to a further aspect of the invention, a high-speed search method for searching a target address is adapted for use in a disc player system having a slider movable along a radius of a disc carrying information including address information, a pickup mounted on the above mentioned slider for reading the above mentioned information of the disc and generating an electric signal, a data demodulator for demodulating address data from the above mentioned electric signal, and a slider movement controller for controlling the movement of the above mentioned slider, and the method comprises the steps of renewing an accumulated value indicative of the number of tracks traversed by the above mentioned pickup on the basis of address data of a predetermined number of digits while moving the above mentioned slider at a speed in a range in which the address data can be obtained at the above mentioned data demodulator, and determining a present address at which the pickup is located, on the basis of the above mentioned renewed accumulated value.

According to still another aspect of the invention, a high-speed search method for searching a target address is adapted for use in a disc player system having a slider carrying a pickup for reading a signal on a disc carrying information including address information, and disposed to be movable in a disc radius and positioned by a drive motor, and the method comprises the steps of obtaining previously data of a stop distance required for stopping the above mentioned slider by applying a braking force to the above mentioned drive motor for each speed of the above mentioned slider at a time of starting of the above mentioned braking, moving the slider toward a target track bearing the above mentioned target address, accumulating the number of tracks traversed by the pickup by means of the signal from the pickup, obtaining a present track position at which the pickup is located and the number of remaining tracks from the above mentioned present track to the above mentioned target track, on the basis of an accumulated number of tracks, detecting a present speed of the slider and searching the number of tracks for stopping at the present speed of the slider from the above mentioned data of the stop distance, and applying above mentioned braking force to the above mentioned drive motor to decelerate the above mentioned slider when the above mentioned number of remaining tracks and the number of tracks for stopping searched out become identical with each other.

According to a still further aspect of the invention a high speed search method for searching a target address is adapted for use in a disc player including a slider carrying a pickup for reading a signal from a disc carrying information including address information, and disposed to be movable in a disc radius and positioned by a drive motor, and the method comprises the steps of accelerating the slider toward a target track associated with the target address, and accumulating the number of tracks traversed by the pickup by means of the signal from the pickup, obtaining a present track position at which the pickup is located and the number of remaining tracks from the above mentioned present track to the above mentioned target track, on the basis of the accumulated number of tracks, detecting a present speed of the slider, calculating a switching time speed by using an ideal deceleration factor of the slider and the above mentioned number of the remaining tracks, applying a braking force to the above mentioned drive motor to decelerate the above mentioned slider when the above mentioned present speed exceeds the above mentioned switching time speed, and controlling the above mentioned braking force so that a deceleration factor of the above mentioned slider becomes identical with above mentioned ideal deceleration factor.

DETAILED DESCRIPTION OF PREFERRED EMBODIMENTS

Figure 1:
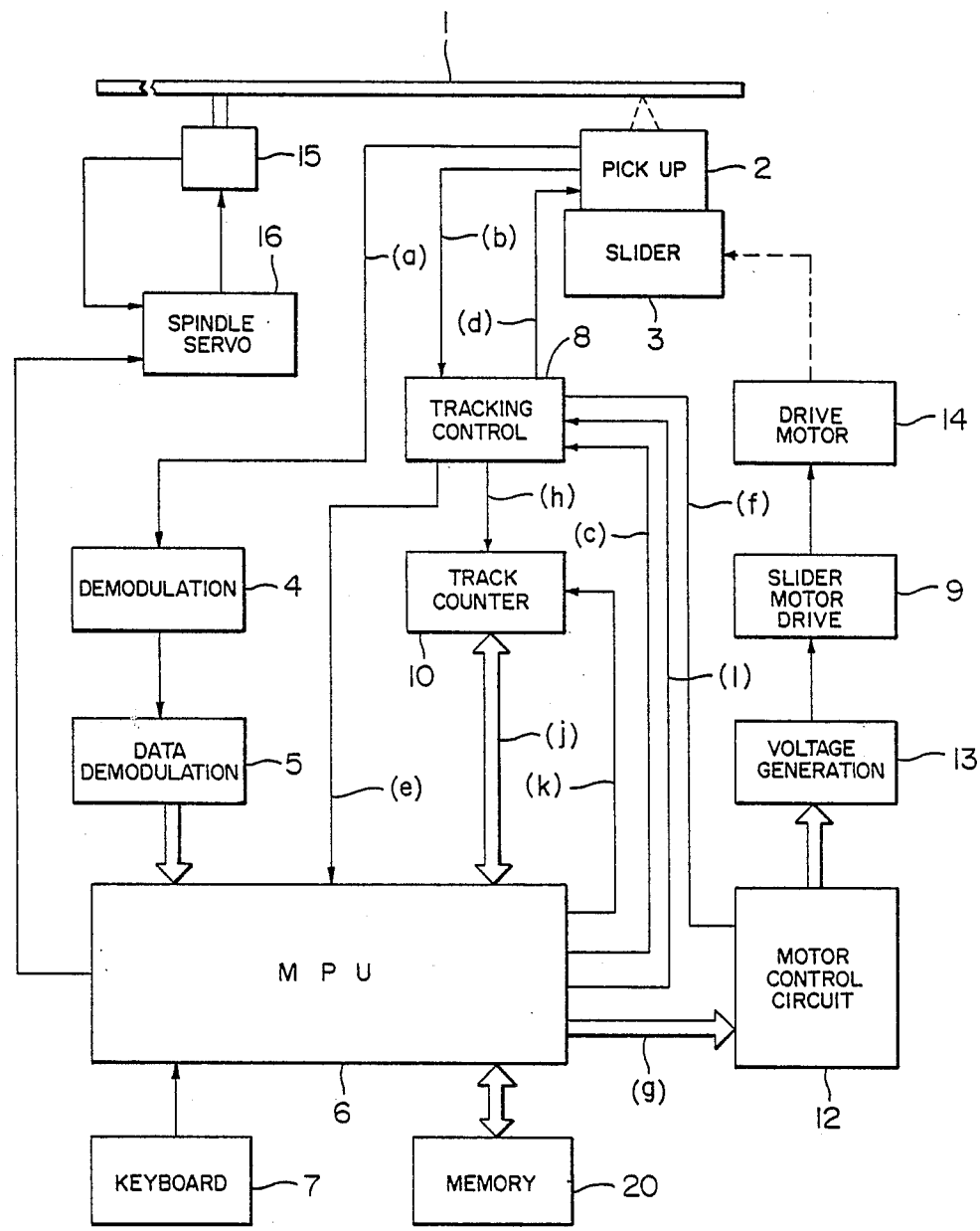
FIG. 1 is a block diagram showing the construction of a disc player system in which a high-speed searching method according to the present invention is suitably embodied.

The embodiments of the high-speed search method according to the present invention will be described hereinafter. At first, the disc player to which the search method according to the present invention is applied is explained with reference to FIG. 1. As shown, a light beam is irradiated on a track formed on a disc 1 from a pickup 2, to form an information detecting light spot. A reflection light of the irradiated light is converted to an electrical signal by means of a photoelectric converting element in the pickup, so that s signal representing recorded information is retrieved as an RF signal. The pickup 2 is so constricted that its information detecting light spot is capable of rocking with respect to a slider 3 on which the pickup 2 is mounted. The slider 3 is driven by means of a quick-response drive motor 14 such as a linear motor of MC (moving coil) type, or a rotary motor of a small inertial moment, thereby it is movable in both normal and reverse directions along a disc radius. The RF signal (a) from the pickup 2 is demodulated to a video format signal at a demodulation circuit 4, and in turn supplied to a data demodulation circuit 5. The demodulation circuit 4 also read-out address data such as the frame number or the time code from a data portion of the video format signal, and supplies them to a microprocessor 6 (simply referred to as MPU hereinafter). From an input device 7 such as a key board, target address data to be searched is supplied to the MPU 6, and stored in a memory 20.

In addition to light receiving-elements for detecting the RF signal, light-receiving elements for the tracking servo operation are provided in the pickup 2, and an output signal from those light-receiving element is supplied to a tracking control circuit 8 as a tracking servo signal (b). The tracking control circuit 8 is operative to perform the so-called tracking servo operation on the basis of the tracking error signal upon presence of a tracking-on signal (c) supplied from the MPU 6. When the tracking servo system is locked-in, a tracking lock signal (e) is supplied to the MPU 6. The tracking control circuit 8 supplies, as a slider servo signal (f), an average value of the tracking tracking error signal (a) to a motor control circuit 12, and the latter circuit supplies a command of generating a voltage corresponding to the slider servo signal (f) to a voltage generation circuit 13 as long as a control command (g) from the MPU 6 is designating the slider servo operation. The voltage generation circuit 13 supplies its output voltage to a slider motor drive circuit 9. Besides, the control command (g) includes an acceleration command, a deceleration command, a constant speed servo command, and a stop command. On the other hand, the amplitude of the tracking error signal (b) varies in the form of a sinusoidal wave when the information reading point is moved to traverse the recording track. Therefore, a signal obtained by a waveform shaping of the tracking error signal (b) is supplied from the tracking control circuit 8 as a track crossing signal (h) to a track counter 10, so that the number of tracks traversed by the information reading point is accumulated in it. In addition, it is also possible to use an envelope signal of the RF signal as the track crossing signal. An accumulated value (j) of the track counter 10 is supplied to the MPU 6, and cleared by a reset signal (k) from the MPU 6. The track counter 10 is constructed so that setting of initial value is possible. The MPU 6 performs the sampling of the accumulated value (j) and detects the speed of movement of the slider 3 in terms of the difference between a present value and a preceding value of the sampled value. A speed signal Vact representing the speed of movement of the slider 3 is supplied to the motor control circuit 12. In addition, it is also possible to obtain the speed of movement by using the cyclic period of zero-crossings of the tracking error signal (b). In the memory 20, control programs of the MPU 6, signal data, and data of deceleration factor which will be described later, etc. are stored.

In addition, when a jump command signal (1) is supplied to the tracking control circuit 8 from the MPU 6, the tracking control circuit 8 forcibly produces the rocking motion of the tracking unit in the pickup irrespective of the tracking error signal so that a jump of an amount corresponding to the content of the jump command signal (1) is performed.

The motor control circuit 12 generates positive or negative voltage output data for setting the direction and the speed of the movement of the slider 3 as well as the brake force, and supplies them to the voltage generation circuit 13. The voltage generation circuit 13 in turn converts the voltage output data to a voltage signal and supplies it to the slider motor drive circuit 9. In accordance with this voltage signal, the slider motor drive circuit 9 supplies an operating current to the quick-response drive motor 14 such as a linear motor which drives or brakes the slider 3 in normal or reverse direction along a disc radius.

A spindle motor 15 for rotating the disc 1 is controlled by a spindle servo circuit 16 which is responsive to a command from the MPU 6, and rotates at a constant speed of rotation when the disc to be played is the so-called CAV disc, at a varying speed to maintain a linear velocity when the disc to be played is the so called CLV disc.

The operation of the system which has been described will be explained with reference to a control flowchart shown in FIG. 2. At first, a target address from which playing of the disc is to be started is supplied to the MPU 6 along with a search command, by an operator through the input device such as the key board, and stored in the memory 20. In the case of the CAV disc, the frame number inserted in an address data portion of the video format signal corresponds to the track number. Hence the frame number can be used as the address data. Then, the CPU issues a command for the tracking servo operation to the tracking control circuit 8 at a step S21. A target frame number $F_{TGT}$ to be searched which is stored in the memory 20 is read-out at a step S22, and a frame number (present frame number) $F_P$ of the present address at which the pickup is being located is read-out from the output signal of the data demodulation circuit 5, at a step S23. Subsequently, a subtraction value D between the target frame number $F_{TGT}$ and the present frame number $F_P$ is obtained at a step S24. The direction of movement of the slider 3 is determined in accordance with the polarity (positive or negative) of the subtraction value D. If it is detected that an absolute value $|D|$ of the subtraction value D is equal to 0, at a step S25, the program proceeds to an end. If it is detected at a step S26 that the absolute value $|D|$ is smaller than 11 and not equal to 0 for example, a command of single jump operation is supplied to the tracking control circuit 8 at a step S27. On the other hand, when the answer is negative at the step S26, the program proceeds to a step S28. If it is detected at the step S28 that the absolute value $|D|$ is equal to or greater than 11 and smaller than 256 for example at the same time, a multi-jump subroutine is performed. If the answer is negative at the step S28, the program proceeds to a step S29. If it is detected at the step S29 that the absolute value $|D|$ is equal to or greater than 256 and smaller than 3072 for example at the same time, the program proceeds to a target-scan subroutine for executing the target address search operation, which will be described later. If it is detected at the step S29 that the absolute value $|D|$ of the subtraction value D is equal to or greater than 3072, the program proceeds to a high-scanning subroutine for executing the target address search operation, which will be described later.

In short, this embodiment features four stages of routines for the purpose of searching the target address, to be selected in accordance with the subtraction value, i.e., the distance $|D|$:

(1) single jump
 (close range)
 frame number difference . . . 1 through 10
  (time required for searching $\leq 100$ ms (milliseconds))
(2) multi-jump subroutine
 (short distance)
 frame number difference . . . 11 through 25

(time required for searching ≦200 ms)
(3) target scanning subroutine
  (medium distance)
  frame number difference ... 256 through 3071
  (time required for searching ≦300 ms)
(4) high scanning subroutine
  (long distance)
  frame number difference ... 3072 though 54000
  (time required for searching ≦500 ms)

Each subroutine will be explained hereinafter.

The single jump is performed only by the tracking control. When the tracking servo is locked and the frame number is read-out, a difference in number between the target frame number and the present frame number is calculated by using the read-out frame number as the present frame number, and the direction and the number of single jump operations are determined. Then, the single jump operation in which the information detecting light spot is moved to the adjacent track by the rocking of the tracking unit is repeated times corresponding to the above difference in number, at intervals of 1 ms. Subsequently, the tracking servo is closed, and the target frame number is read, to complete the single jump operation.

The multi-jump subroutine will be explained with reference to FIG. 3. The so-called multi-jump operation is performed in such a manner that the information detecting light spot is moved to traverse one hundred tracks at most continuously by the rocking motion of the tracking unit in the pickup, per one rocking motion. In this subroutine, a track counter reset command by which the track counter 10 is cleared is issued and the direction of movement of the pickup 2 is determined in response to the polarity (positive or negative) of the subtraction value D, at a step S31. Then, a multi-jump command is supplied to the tracking control circuit 8, at a step S32, so as to cause the rocking motion of the tracking unit. The program proceeds to a step S33 in which whether or not a value Nt held in the track counter 10 has increased to exceed 100 is detected. If the answer is affirmative, a halt command of the supply of the multi-jump command is issued, to complete the multi-jump operation, at a step S34. If the answer at the step S33 is negative, the program goes back to the step S32. If the speed of movement of the information detecting light spot which traverses the tracks by the multi-jump operation is set at $10 \times 10^3$ (denoted by 10K hereinafter) tracks/seconds, then the time required for one execution of the above multi-jump operation of one hundred tracks becomes approximately 10 ms. After completing this subroutine, the program proceeds to the step S21 shown in FIG. 2.

Figure 4:
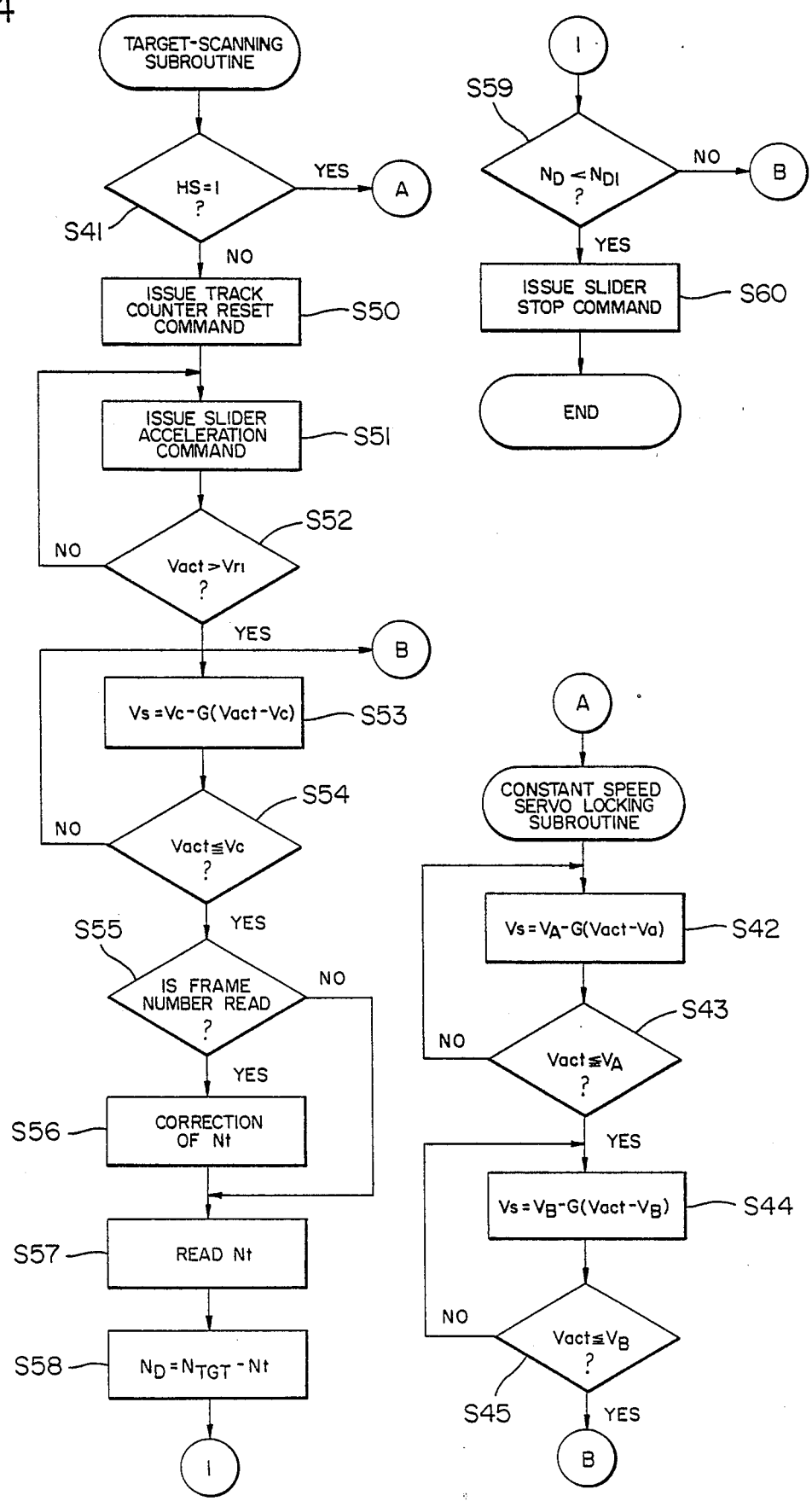
FIG. 4 is a flowchart showing a control procedure in a target-scan subroutine.

With respect to the target scanning subroutine, the explanation is given with reference to the control flowchart shown in FIG. 4. The operation of the target scanning subroutine is classified broadly into an accelerating stage (steps S50 through S52), a constant speed stage (steps S53 through S60), and a converging stage of correction multi-jump operation and correction single-jump operation, which are not illustrated. In this subroutine, whether or not an HS flag which will be described later is equal to 1 is detected at a step S41. If the answer is negative, a counter reset signal is supplied to the track counter 10 so that the value (j) accumulated in it is cleared at a step S50. Then a command for accelerating the slider is supplied to the motor control circuit 12 at a step S51. In response to this acceleration command, the motor control circuit 12 supplies a voltage level data having the polarity (positive or negative) corresponding to the polarity of the subtraction value D to the voltage generation circuit 13. Consequently, an acceleration voltage of the desired level is supplied to the slider motor 9, to start the acceleration of the slider 3. The supply of the acceleration command is continued, by the operation at the step S51, until the present speed Vact of the slider exceeds a predetermined speed Vr1 of 9 K track/second, for example. At a step S52, whether or not the predetermined speed Vr1 is exceeded by the present speed Vact is detected. If the answer is affirmative at the step S52, a speed setting signal Vs is supplied to the motor control circuit 12 at a step S53 so as to effect the constant speed servo operation by which the slider speed is locked at a target speed Vc which is lower than an upper limit speed $Vr_2$ of 8 K track/s, for example, of a range in which the demodulation of the data portion of the video format signal is possible. The speed setting signal Vs is designated by a subtraction value between the target speed Vc and a value obtained by a multiplying the difference between the present speed Vact and the target speed Vc by a coefficient G of the servo system. The motor control circuit 12 supplies a command to the voltage generation circuit 13 to generate a voltage corresponding to the speed setting signal Vs. By repeating the operation of the step S53, the speed servo operation is performed.

Subsequently, whether or not the present speed Vact has exceeded the target speed Vc (in tracks/second) is detected at a step S54. If the answer is affirmative at the step S54, demodulation output of the frame number from the data demodulation circuit 5 is monitored at a step S55. During the movement of the slider through a given distance, there repeatedly appears a period in which the information detecting light spot scans an address data portion on the track at a constant rate. After reading the frame number using this period, the value (j) accumulated in the track counter 10 which accumulates the number of tracks traversed is converted to the frame number, to set an accurate present address, at a step S56. If the frame number (j) is not read at the step S55, the accumulating operation of the track counter is continued. Then, the accumulated value Nt of the track counter is made as the present address at a step S57, and a value obtained by subtracting the accumulated value Nt from a number of tracks $N_{TGT}$ from a reference position to a target track in which the target address is located, that is, a remaining distance $N_D$, is calculated at a step S58. The program then proceeds to a step S59 in which whether or not the remaining distance $N_D$ is smaller than a predetermined distance $N_{D1}$ of 200 tracks for example is detected. If the answer is affirmative at a step S59, a slider stop command is supplied to the motor control circuit 12 at a step S60. If the answer is negative at the step S59, the operations of the steps S53 through S59 are performed once more. When this subroutine is completed, the program goes back to the step S21 shown in FIG. 2.

If the HS flag is 1 a step S41, it indicates that the high-scanning subroutine which will be described later has been completed and indicates that this routine shown in FIG. 4 is to be executed. In this case, a constant speed servo locking subroutine is performed. At first, a command for a constant speed servo operation of a predetermined speed $V_A$ of 54 K tracks/second for example, is generated at a step S42. Then, at a step S43, whether or not the present speed Vact has reduced to be lower than the predetermined speed $V_A$ is detected.

If the answer is affirmative at the step S43, a command is generated to designate a constant speed servo operation of a predetermined speed $V_B$ of 36 K tracks/second, for example, at a step S44. Then the program proceeds to a step S45 in which whether or not the present speed Vact has reduced to be lower than the predetermined value $V_B$ is detected. If the answer at the step S45 is affirmative, the program proceeds to a step S53.

By shifting from the high-scanning subroutine to the target scanning subrountine through this constant speed servo locking subroutine, the slider is stabilized at an early time, and a smooth transition to a constant speed region is enabled.

Thus, in this constant speed region, address data is read while the slider is moved at a relatively high speed, so that a precise counting is enabled by repeating the correction of the accumulated value in the track counter.

At this time, operations in steps S56 through S59 will be further explained. In the case of commercially available optical video discs, address data such as the frame number of video information is inserted on the seventeenth and eighteenth scanning lines of the first field, for example. As the slider is moved, the maximum speed of the speed range in which it is possible to read codes from the disc occurs when the information detection light spot traces each track by the minimum amount of 1H (63.5µ second). Since the maximum number of tracks on a CAV disc is 54000, and a slider moving time T required for the slider to move across them is 3.4 seconds ($63.5 \times 10^{-6} \times 54000 = 3.4$). If the slider is moved at the maximum speed of the range in which the demodulation of the address data is possible, the address data can be read every one revolution of the disc (33.3 ms). Therefore, the number of tracks which are traversed while the address data is read is calculated to be 529 tracks ($54000/3.4 \times 33.3 \times 10^{-3} = 529$). Hence, if the searching is performed by using only address data, the precision in reading can not be lowered below 529 tracks.

On the other hand, in the case where the number of tracks traversed by the information detecting light spot has is accumulated in the track counter, a count error may be generated if there is any cause such as scratches on the disc, dust, noises, the focus error or when the slider speed is made lower than 8 kHz (8 K tracks/second) from which effect of the eccentricity of the disc appears (for instance, the change in speed corresponding to the tracks traversed by the eccentricity of disc is at most 8 kHz, and the maximum speed of a range in which the reading of the address data is 18 kHz).

Therefore, in searching, the reading of the address data and the operation of the tracking counter are used jointly so that the accumulated value in the tracking counter is periodically corrected to a proper value by the frame number functioning as the address data. By this operation, count error is eliminated each time and the precision in detecting the present address is increased. Moreover, an advantage can be obtained that the searching time is shortened since it is unnecessary to stop the slider and to lock the tracking servo system for the demodulation of the address data.

In addition, in the case of CAV discs, the address data can be demodulated while the slider is moved along a disc radius with the tracking servo system open. On the other hand, in the case of CLV discs, the recording signal recorded in each track is not synchronized with each other along a disc radius. Therefore, the slider is moved with the tracking servo system closed, and the data is demodulated while the pickup traces a selected section of each track through the rocking motion of the tracking unit in the pickup.

Figure 5:
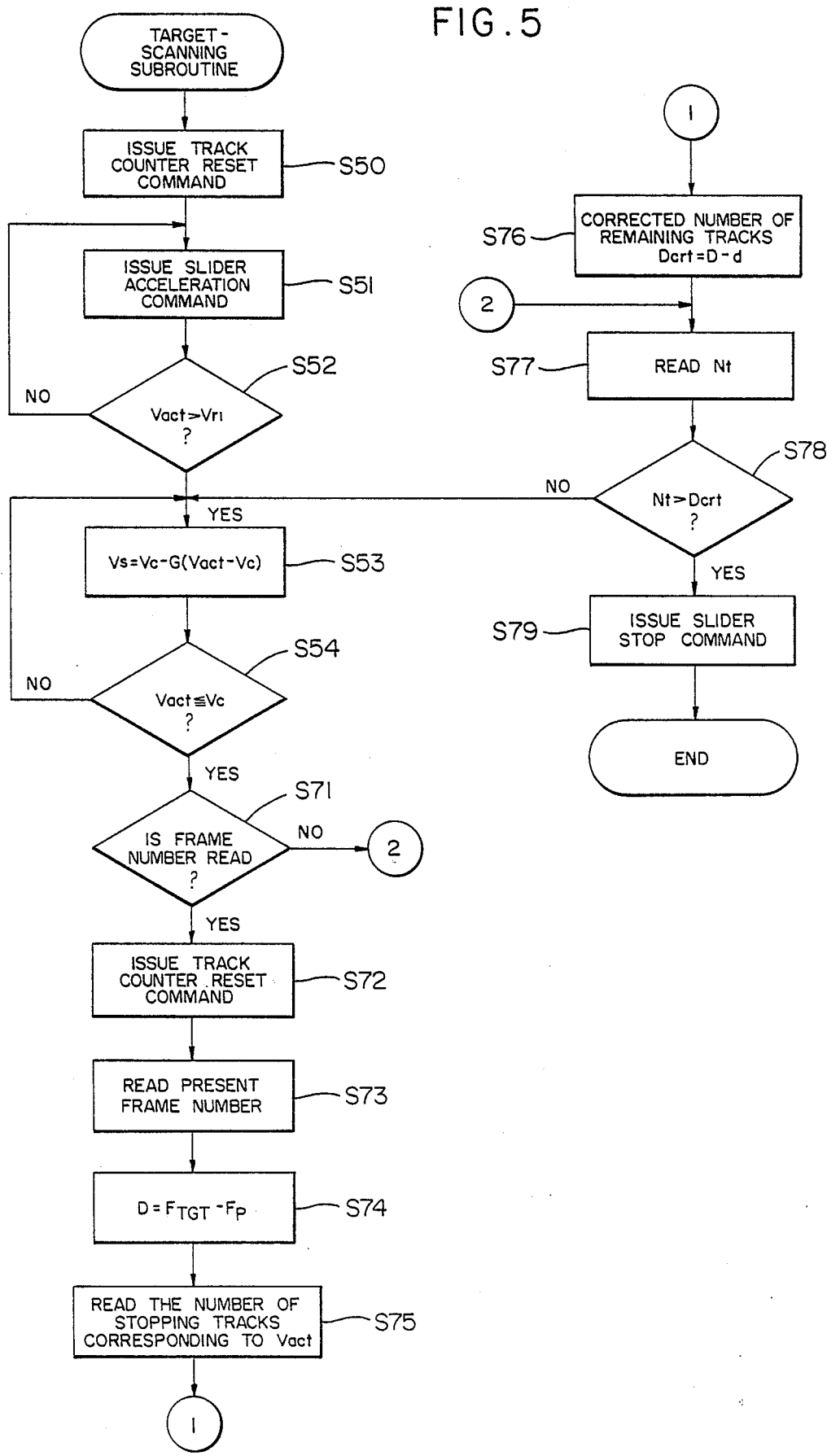
FIG. 5 is a flowchart showing a control procedure in another example of target-scan subroutine.

Other control procedures in the target scanning subroutine will be explained with reference to FIG. 5. In the flowchart shown in FIG. 5, the operation of the steps S50 through S54 are the same as those of the steps S50 through S54 in FIG. 4, and the explanation thereof will not be repeated. Subsequent to the step S54, in a state where the constant speed servo operation is performed, address data is demodulated at the data demodulation circuit 5 and in turn supplied to a present address memory region of the memory 2 through the CPU 6, and the present frame number $F_p$ is renewed. At this time, whether or not the frame number $F_p$ is read is detected at a step S71. If the answer at the step S71 is affirmative, a reset signal is supplied to the track counter 10, to clear the accumulated value, at a step S72. Then the present frame number $F_p$ and the target frame number $F_{TGT}$ are read at a step S73 and the remaining distance D is calculated at a step S74. The program proceeds to a step S75 in which a stop distance (distance to a stop position (number of tracks to the stop position)) is read-out from the memory 20 in which distance values are previously stored in the form of a map, at a step S75. Then, a corrected remaining frame number Dcrt is calculated by subtracting the stop distance d from the remaining distance D, at a step S76. Then the accumulated value Nt in the track counter 10 is read-out at a step S77, and in turn compared with the corrected remaining frame number Dcrt at a step S78. If the accumulated value Nt has exceeded the corrected remaining frame number Dcrt, the constant speed servo operation is terminated, and a command for stopping the slider is generated, to complete this subroutine, at a step S79. Otherwise, the program proceeds from the step S78 to the step S53 so that the above described operations from the step S71 are repeated. If the frame number $F_P$ is now renewed at the step S71, the program proceeds to the step 77 at which the different of the accumulated value Nt of the track counter is read, and subsequently to the step S78 to judge the timing to stop the slider.

Thus, the remaining frame number D is calculated each time the precise present address $F_P$ is demodulated, and the accumulated value in the track counter 10 is cleared. Then, the timing to stop the slider is judged by comparing the number Nt of tracks traversed by the information detecting light spot after the above clearing and the corrected remaining frame numbers Dcrt. Therefore, the precision in detecting the present address is raised, and the effect of count errors which can be generated by scratches on the disc or dusts is minimized.

Moreover, since the amount d of the distance to the stop position traveled after starting of braking due to the inertia of the slider is previously compensated for, it is possible to prevent an over-run of the slider even in the case of a slider driven by a linear motor in which the frictional resistance to the slider is very low.

Figure 6:
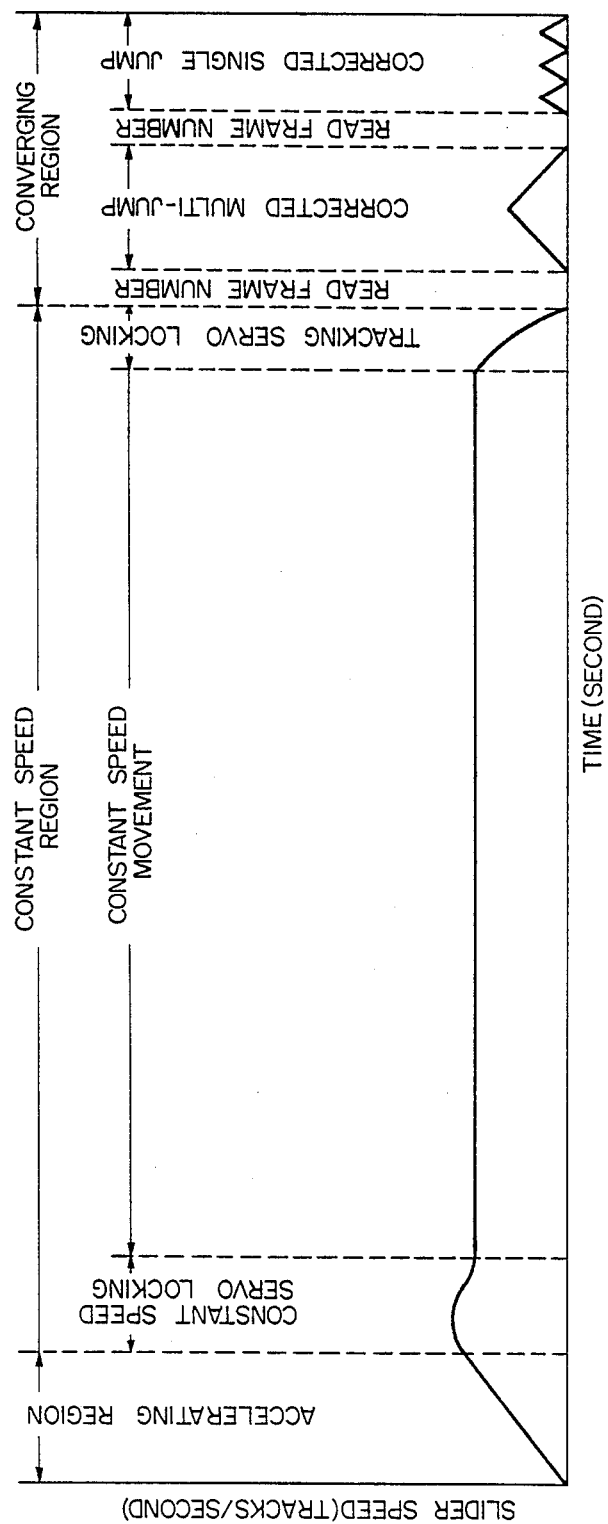
FIG. 6 is an explanantory diagram for explaining an example of change in the speed of slider when the search is started from the target-scan subroutine.

An example of change in the speed of slider in a case where the search operation is performed from the target scanning subroutine is illustrated in FIG. 6.

Figure 7:
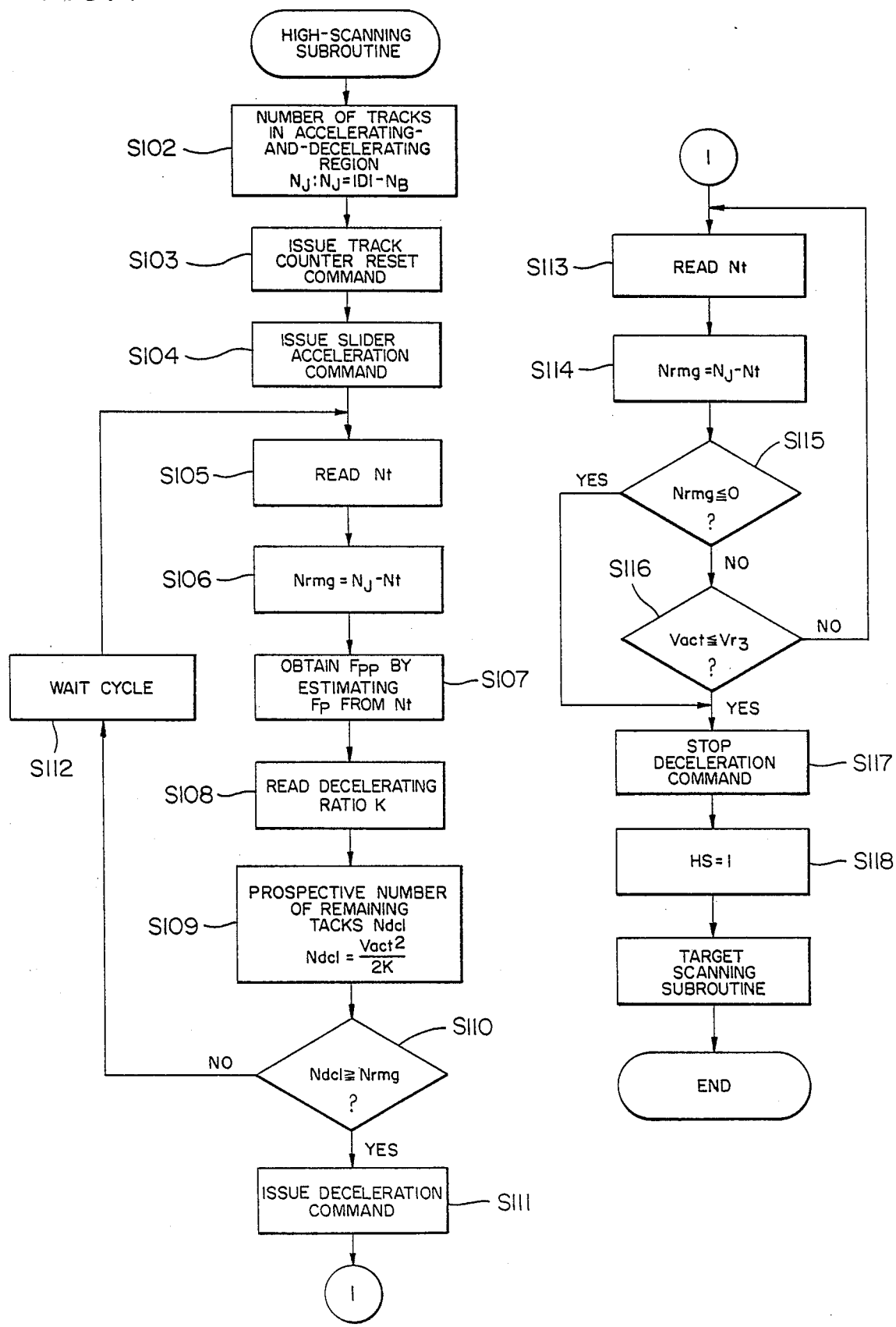
FIG. 7 is a flowchart showing a control procedure in a high-scanning subroutine.

The high-scanning subroutine will be described with reference to FIG. 7. In the high-scanning subroutine, the open control is performed in accelerating and decelerating stages (steps S104 through S117), and subsequently the operation shifts into the aforementioned target scanning subroutine.

Figure 2:
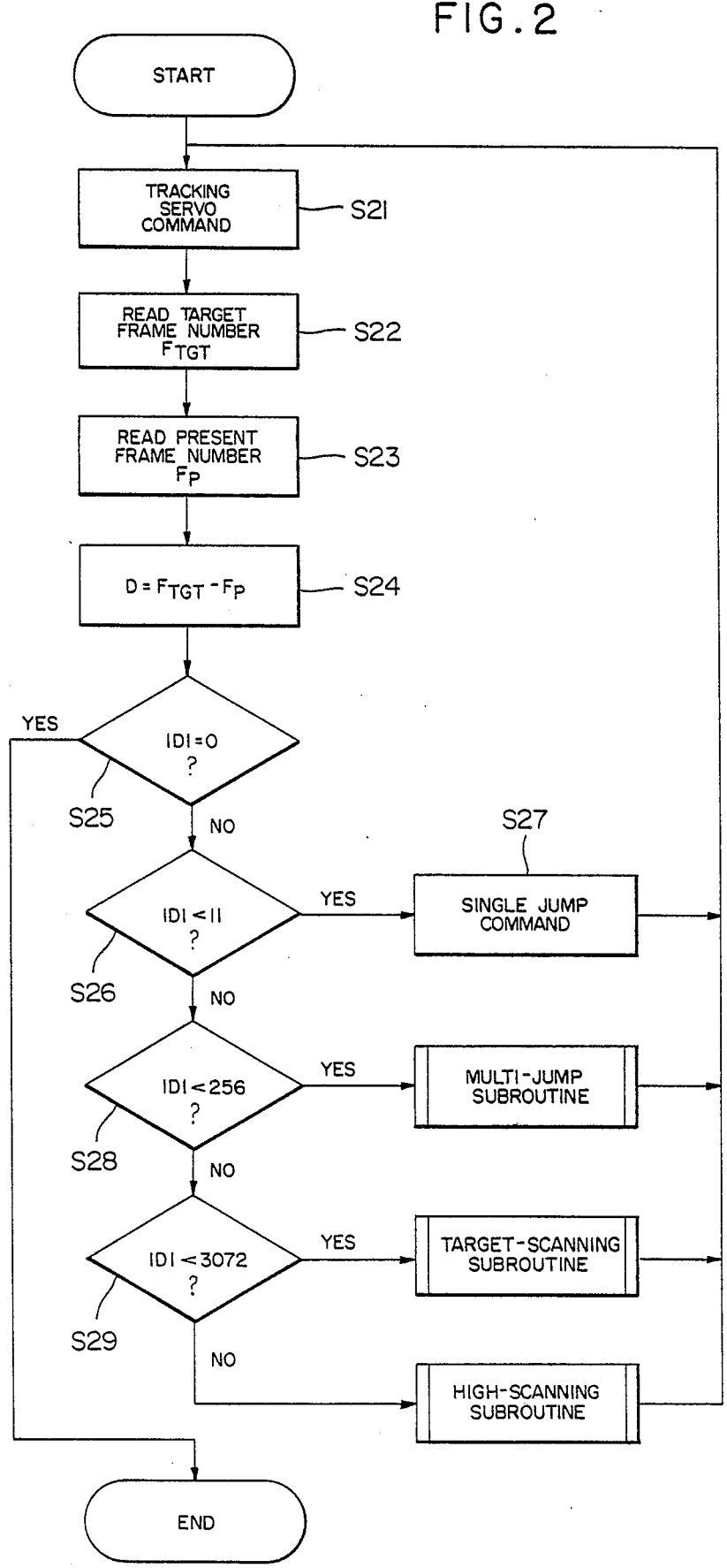
FIG. 2 is a flowchart showing a procedure for selecting an optimum subroutine in accordance with distance.
Figure 3:
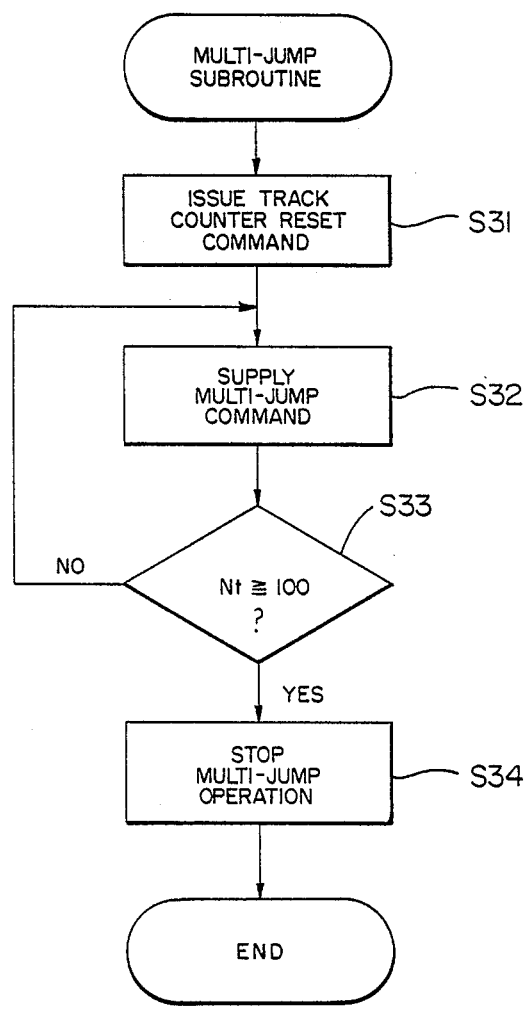
FIG. 3 is a flowchart showing a control procedure in a multi-jump subroutine.

When the high-scanning subroutine is selected in the step S29 of FIG. 2, the number of tracks which are to be traversed by the slider during the accelerating and decelerating regions is calculated by subtracting from the distance D the number $N_B$ of the tracks in the aforementioned constant speed region and the converging region, at a step S102. For instance, the number of tracks obtained by subtracting 3600 tracks (18 K (tracks/second)×200 ms) from the total track number is made as a track number Nj of the accelerating and decelerating regions, representing the number of tracks to be traversed by the information detecting light spot in the accelerating and decelerating regions. Then, a command for resetting the track counter is issued at a step S103, and a slider accelerating command is generated and supplied to the motor control circuit 12 at a step S104. At this time, the voltage generation circuit 13 generates a maximum voltage for example, to start the movement of the slider 3. Then the accumulated value Nt of the track counter 10 is read-out at a step S105, and the number Nrmg of remaining tracks in the acceleration and deceleration regions is calculated by subtracting the number Nt from the number Nj, at a step S106. Then the program proceeds to a step S107 in which the frame number Fpp of the present address is estimated. Then, a deceleration factor K is read from a deceleration-factor data map which will be described later, for a condition in which slider 3 is decelerated by the supply of the deceleration command to the motor drive circuit 12 during a range from the estimated frame number to a frame number corresponding to the track number at the end of the accelerating and deceleration region, at a step S108. After the step S108, a prospective number Ndcl of remaining tracks, representing the number of tracks to be traversed by the information detecting light spot from the start of the braking to the stop of the movement of slider 3, is calculated by using an equation of Ndcl=Vact$^2$/2 K, at a step S109. The number of derivation of the above equation will be described later. Then the program proceeds to a step S110 in which whether or not the numer Nrmg is exceeded by the number Ndcl is detected. If the answer is affirmative at the step S110, the acceleration command is canceled and a deceleration command is supplied to the motor control circuit 12 at a step S111. In response to the above mentioned deceleration command, the motor control circuit 12 controls the voltage generation circuit to generate a predetermined braking voltage to stop the movement of the slider 3. If the answer is negative at the step S110, i.e. if the number Ndcl does not exceeds the number Nrmg, the program goes back to the step S105 through a step S112 of a wait cycle having sampling intervals of 0.5 ms, to repeat the operations of the steps S105 through S110. Then the accumulated value Nt and the number Nj of tracks in the acceleration and deceleration regions are read-out at a step S113 and the number Nrmg of remaining tracks in the acceleration and deceleration regions is calculated at a step S114. Then the program proceeds to a step S115 in which whether or not the number Nrmg of remaining tracks is equal to or lower than 0 is detected. If the answer at the step S115 is negative, the program proceeds to a step S116 in which the present speed Vact is equal to or lower than a predetermined reference speed Vr3 of 80 K tracks/second is detected. When the answer is affirmative at the step 115 or 116, the supply of the deceleration command is stopped at a step 117. If the answer at the step 116 is negative, the program goes back to the step S113 to repeat the operation of the steps 113 through 116, to continue the deceleration. When the deceleration command is canceled, a number 1 is set to the deceleration flag HS, and the program shifts to the above mentioned target scanning subroutine, at a step S120. When the flag HS is 1 (HS=1), the constant servo locking subroutine is executed as described before in the target scanning subroutine.

Figure 8:
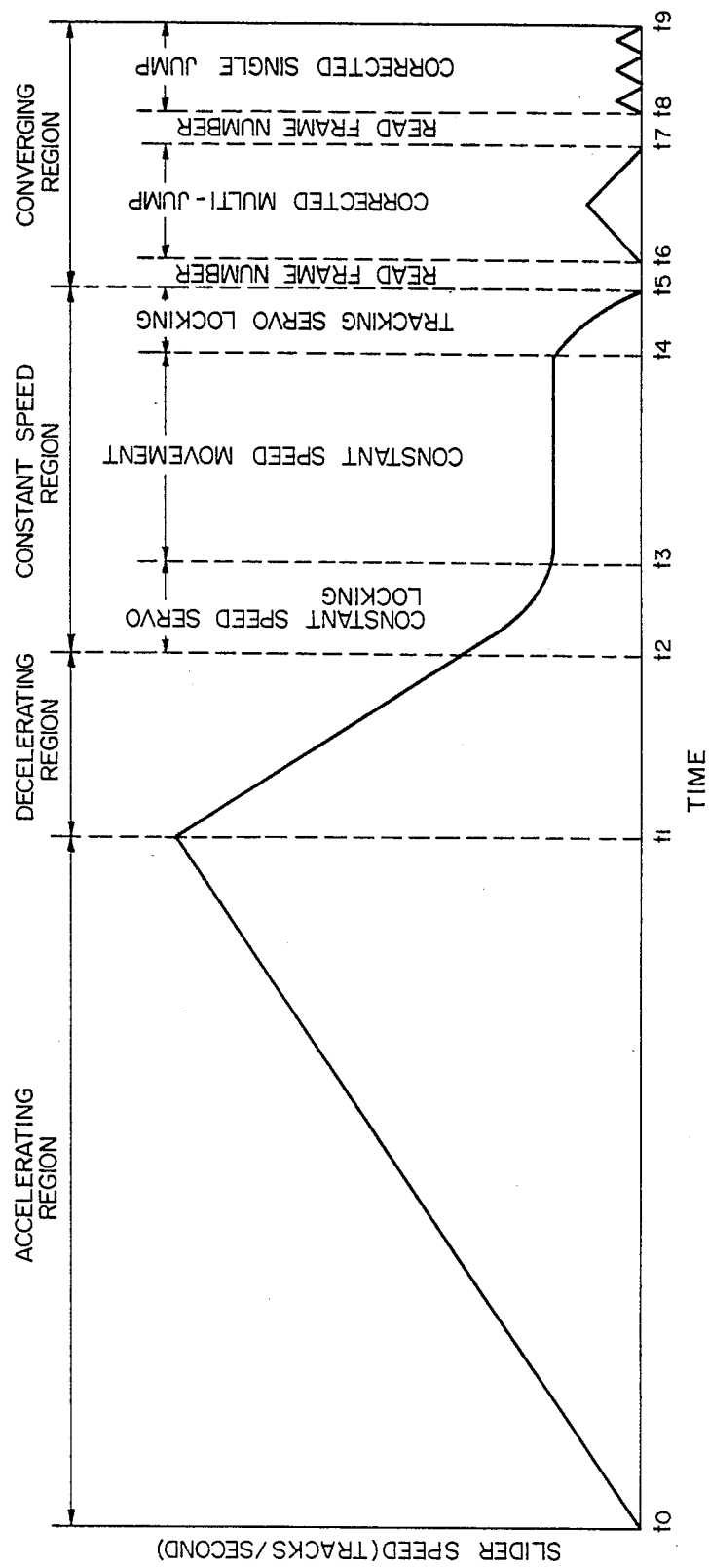
FIG. 8 is an explanatory diagram for explaining an example of the change in the slider speed when the search is started from high-scanning subroutine.

With the search method according to the present invention, the slider speed varies as illustrated in FIG. 8 when the absolute value $|D|$ of the difference between the target frame number $F_{TGT}$ and the present frame number $F_P$ is larger than 3072, for example.

In FIG. 8, during a period from a start time $t_0$ of the searching to a point of time $t_1$, the slider acceleration command is supplied to the motor control circuit 12. Therefore, the slider 3 accelerated with the predetermined acceleration. At the time $t_1$, the relation of Nrmg<Ndcl at the step S110 is satisfied, and the deceleration command is supplied to the motor control circuit 12 at the step S112. Subsequently, at a point of time $t_2$, one of the relations Nrmg≦0 or Vact≦Vr$_3$ is satisfied, and a cancellation of the deceleration command is instructed to the motor control circuit 12 at the step S117. Subsequently, during a period from the time point $T_2$ to a point of time $t_3$, operations of the steps S42 through S45 of the constant speed servo locking subroutine are performed. At the time point $t_3$, the slider speed reaches to a value around Vr$_2$, and it is controlled to a constant speed Vc which is equal to or lower than Vr$_2$ through steps S53 and S54. At a point of time t4 when the number $N_D$ becomes lower than $N_{D1}$, a slider stop command is generated and the movement of the slider stops at a point of time $t_5$. Then, the tracking servo command is supplied to the tracking control circuit 8. The tracking servo system is locked-in at a point of time $t_6$, and the difference of frame number is obtained. The comparison of this difference is performed, and the multi-jump subroutine is executed to a point of time $t_7$ if the difference is equal to or greater than 11 and less than 25. When the difference becomes smaller than 11, the single jump operation is repeated from a point of time $t_8$ to a point of time $t_9$.

Thus, the open loop control, in which the timing of the shift from the accelerating region to the deceleration region is properly controlled in the high scanning subroutine, is performed to move the slider quickly. Subsequently, when the predetermined remaining address is reached through the operation of the target scanning subroutine in which the reading of address data during the movement of the slider at the constant speed is repeated, the fine adjustment is performed mainly by the rocking motion of the tracking part of the pickup. Thus, a very quick searching operation is enabled.

Figure 10A:
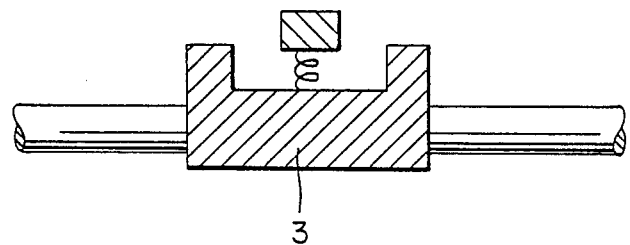
FIGS. 10A and 10B are explanatory diagrams for explaining a rocking movement of the tracking unit.
Figure 10B:
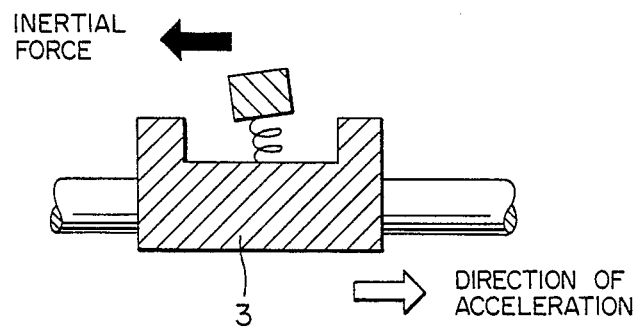

When the slider 3 is accelerated or decelerated rapidly, the rocking motion of the tracking unit of the pickup 2 is generated by the inertial force as illustrated in FIG. 10, and it can cause count errors.

Figure 9:
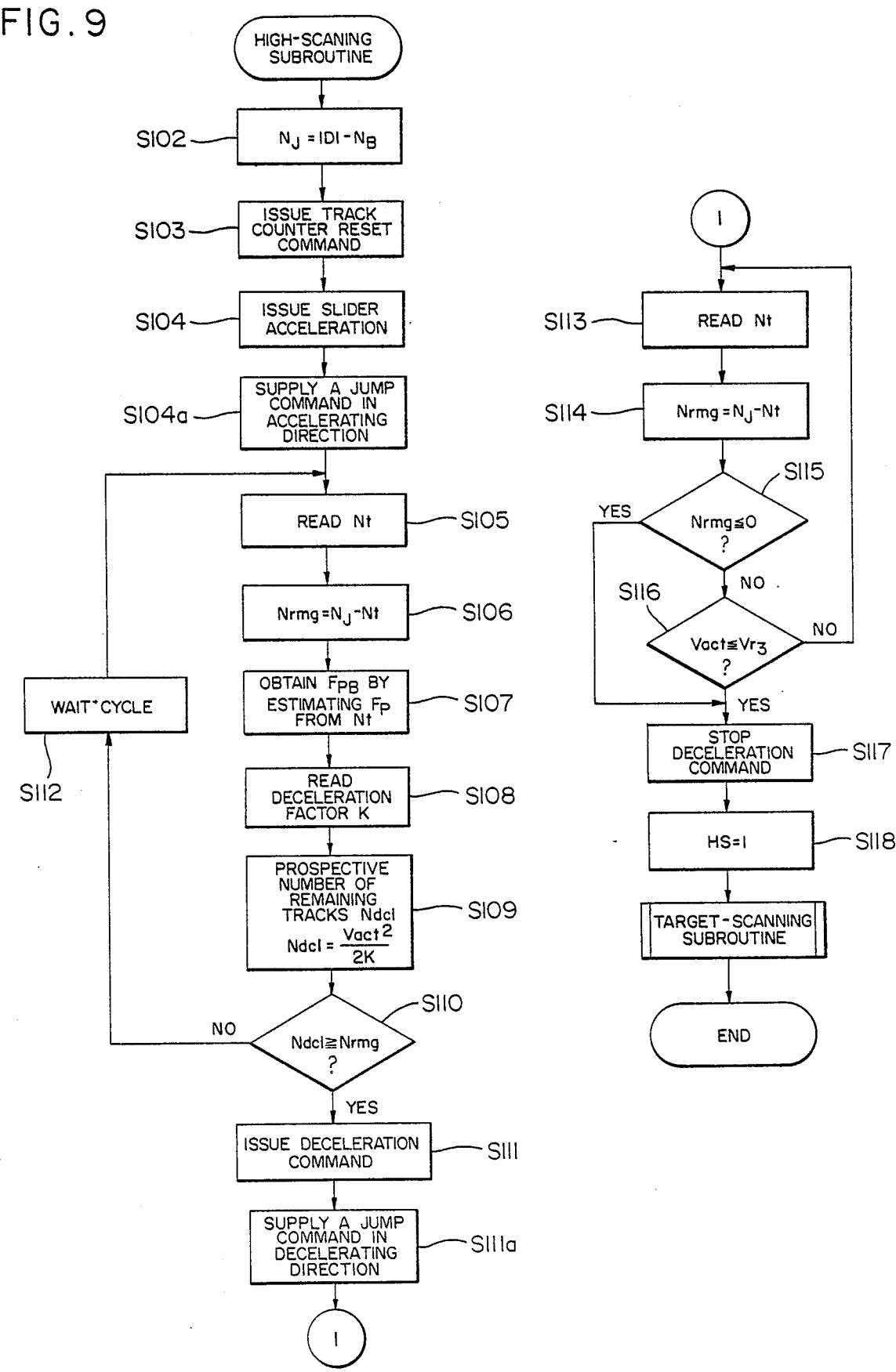
FIG. 9 is a flowchart showing a procedure in suppressing vibrations of a tracking unit of the pickup.
Figure 12:
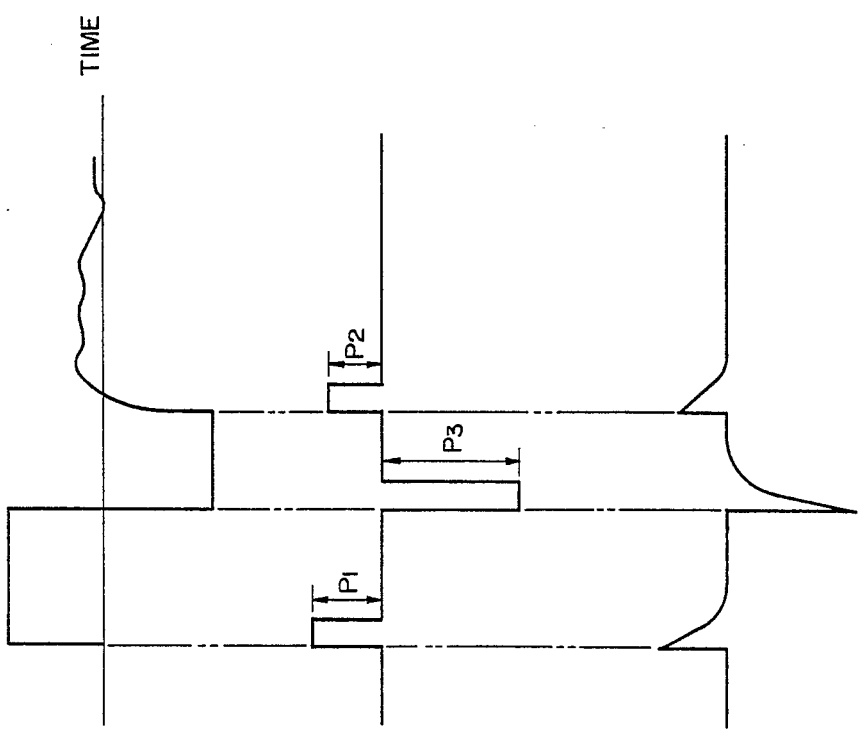
FIGS. 12A through 12C are explanatory diagrams showing a relationship between the output voltage of a voltage generation circuit 13 and jump signals.

FIG. 9 shows an example in which a measure for preventing the above count errors is taken in the high scanning subroutine shown in FIG. 6. In these figures, like reference numerals denote like elements or corresponding parts, and the explanation thereof will not be repeated. The example features steps S104$a$ and S111$a$ shown in FIG. 9. When the MPU 6 generates the acceleration command for the slider at a step S104 and the deceleration command at the step S111a, it supplies at the step S104a or the step S111a a jump command for generating the rocking motion of the tracking unit directed against the inertial force generated by the acceleration or deceleration so that the rocking motion of the tracking unit is reduced. In short, this jump command is to supply a command for causing the rocking motion of the tracking unit responsive to the acceleration or deceleration, to the tracking control circuit 8. In addition, it may be possible to arrange that an adjustment of the magnitude of the rocking motion of the tracking unit is performed in accordance with the acceleration or deceleration force. Specifically, as illustrated in FIG. 12A or 12B, when the output voltage of the voltage generation circuit 13 is turned on or off, the tracking control circuit 8 desirably supplies a jump signal having a level or a pulse width corresponding to the level of the above mentioned output voltage to the tracking unit as a brake signal, so that the tracking unit is applied a force against the acceleration or deceleration forth. The oscillation of the tracking unit is thus prevented.

Figure 11:
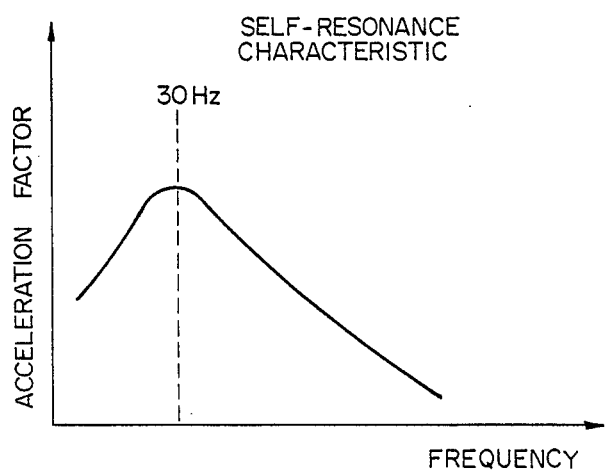
FIG. 11 is a diagram showing a self-resonance characteristic of the tracking unit.

Additionally, if the resonance characteristic of the tracking unit has a peak around 30 Hz as illustrated in FIG. 11, it is desirable to set the time duration T of the application of the jump signal at around 16 ms ($T=(1/30)/2 \approx 16$ ms). Moreover, as illustrated in FIG. 12C, it is also desirable to reduce the level of the jump signal as time passes, so that the shock applied to the tracking unit is reduced.

Figure 13:
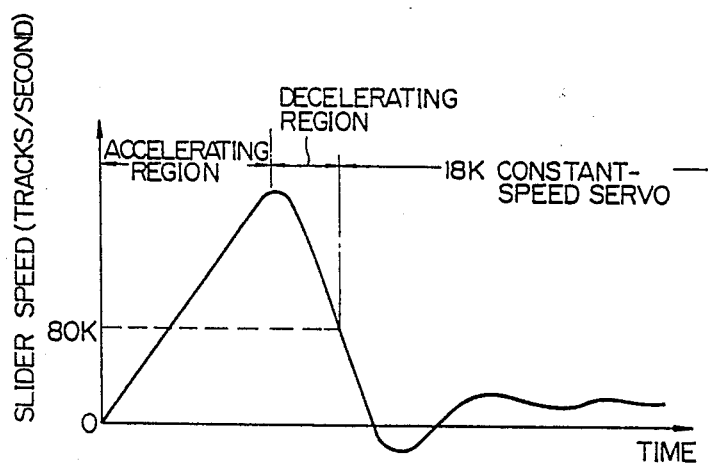
FIGS. 13 and 14 are explanatory diagrams for explaining the stabilization of the slider.
Figure 14:
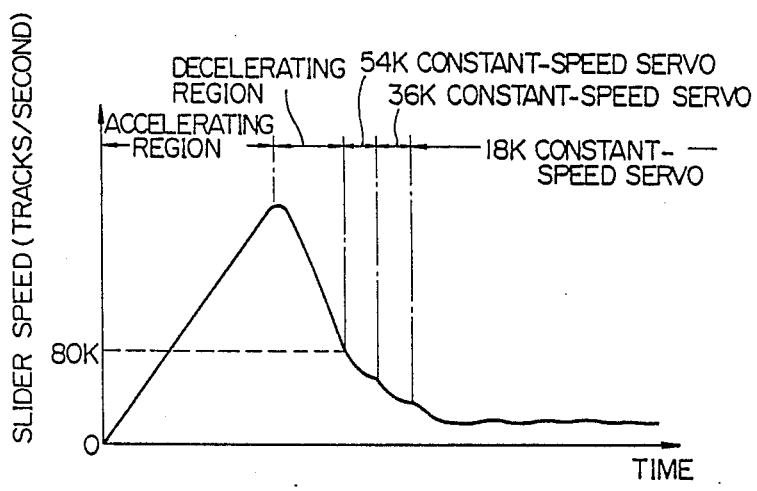

Furthermore, the constant speed servo locking subroutine is operative to properly set the change characteristic of the deceleration towards the subsequent stage of the constant speed movement, so that the slider is stabilized at an early time. As illustrated in FIG. 13, a time is required before the slider is stabilized because of its oscillation if the system is operated, after passing through the acceleration region and the deceleration region, to immediately shift into the constant speed region in which the constant speed control is performed by the speed servo operation of Vc=18 K tracks/second for example. Therefore, as illustrated in FIG. 14, when the speed of the slider is slowed down to 80 K tracks/second, a 54 K speed servo operation for controlling the speed of the slider at 54 K tracks/second is performed to reduce the deceleration, and the operation is shifted to the constant speed servo operation of 18 K tracks/second after passing through a 36 K speed servo operation for controlling the speed of the slider at 36 K tracks/second.

These speed servo operations are performed, for example, by obtaining the present speed Vact by sampling the accumulated value Nt of the track counter 10 at intervals of 0.5 ms, and controlling the output voltage of the voltage generation circuit 13 in accordance with the difference between the present speed Vact and the target speed. In addition, it is also possible to arrange that the target speed $V_A$ is corrected by using an equation of $V_A=V_A-n.\Delta$, and replacing the value for n in the above equation in turn depending on time, the present speed Vact, or the track count value, thereby controlling the speed stepwise.

By the implementation of the servo operations in stages in this way, a smooth shift from, for example, the deceleration region in which a maximum braking force is applied to the constant speed region is enabled.

The deceleration-factor data map will be explained next.

In the high-scanning subroutine which has been described above, the open control is adopted in which the slider is accelerated, for example, at a maximum speed in the acceleration and deceleration regions in order to move the slider quickly near to the target address and the maximum deceleration force is applied from a predetermined switching point to decelerate the slider, thereby shortening the time period of searching operation.

In order to execute this open control, it is desirable that the operating characteristic of the drive system such as the slider as a whole in the acceleration and deceleration region is a uniform characteristic. However, when a linear motor is used, the driving force generated by the motor is dependent on factors such as the magnetic field in which the driving coil of the motor is located. This magnetic field is not uniform, and generally change in the driving force or the braking force becomes non-linear when the position of the drive coil is changed successively. Furthermore, these characteristics are subject to time aging. Moreover, frictional resistance is generally small for sliders in which a linear motor is utilized. Therefore, if the braking force is not positively applied, the slider will not stop at the target position due to the inertial force.

Accordingly, it is desirable to use a deceleration-factor data map so that the precision of control in the open control is improved.

Figure 15:
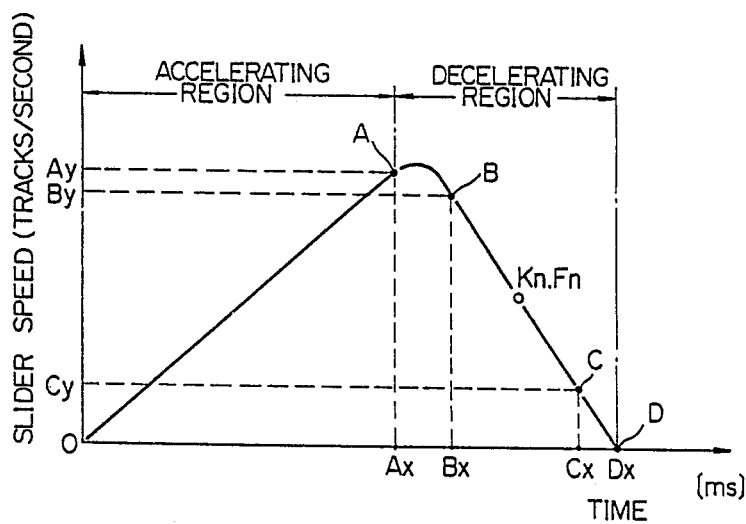
FIGS. 15 and 16 are explanatory diagrams for explaining deceleration-factor data maps used in an open control.

The explanation will be given with reference to FIG. 15 hereinafter. In FIG. 15, it is assumed that the acceleration of the slider 3 starts at a point O at which the frame number is F. After the elapse of time $A_X$, the maximum braking force is applied after a point A at which the speed is $A_Y$. Then, the slider reaches a first measuring point B at which the speed is $B_y$ at an elapsed time $B_X$, and the deceleration is continued to reach a second measuring poit at which the speed is reduced at $C_Y$, at an elapsed time $C_X$. In this case, the area of a quadrilateral OABB corresponds to the number $T_B$ of tracks traversed while the slider moved from the point A to the point B. Similarly, the area of a quadrilateral OABCC$_X$ corresponds to the number Tc of tracks traversed while the slider moved from the point A to the point C. The area of a quadrilateral BCC$_X$B$_X$ corresponds to the number $T_{BC}$ of tracks traversed while the slider moved from the point B to the pont C, where $T_{BC}=T_C-T_B$.

The frame number Fn of a middle point between the points B and C is given by an equation of: $F_n=F+T_B+(T_{BC}/2)$, and a deceleration factor Kn at the frame of the number Fn is given by an equation of: $K_n=|(C_Y-B_Y)/(C_X-B_X)|$ tracks/sec$^2$. Additionally, the point B is selected as the first measuring point instead of the point A because of the consideration of the rocking movement of the pickup or its tracking unit when the braking force is soddenly applied to the slider.

Figure 16:
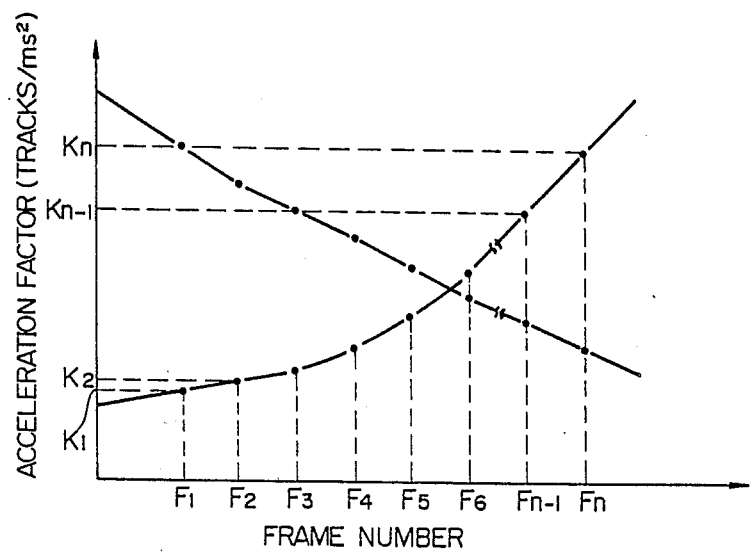

A graph showing the relation between the frame number and the deceleration factor Kn at each frame number can be obtained by repeatedly performing the measurement and the calculation with the accelerating time $A_X$ varied in order from short to long. The deceleration factor between the frame of the number Fn and the frame of the number Fn+1 is calculated, for example, by the linear approximation. This process is performed both for the movement of the slider in the normal direction and the movement of the slider in the reverse direction. An example of the thus obtained graph of the deceleration factor is illustrated in FIG. 16. This graph is stored in the memory 20 as the deceleration factor data map with which the search is possible by using the frame number, for example.

The formation of this deceleration factor data map is, for example, automatically performed when the disc is loaded after throw-in of the power supply. In addition, it is also possible to store the data map previously in the memory 20 in accordance with the design specification, so as to make it unnecessary to prepare the data map respectively for each player on the basis of actual measurements. Also, it is desirable that each value in this data map is renewed by a learning function so that renewal is performed by measuring the deceleration factor each time the deceleration operation is performed in the high-scanning subroutine. With this feature, it becomes possible to deal wit the time change of the braking force at each frame number or variation of the braking force from one player to another.

Next, explanation will be made as to the manner of judgement of the timing of the switch from the acceleration region to the deceleration region using this deceleration factor data map.

Assume that a target total number of tracks to be traversed in the acceleration region and the deceleration region up to the point D is denoted by $T_M$, and the total number of traversed tracks at the point A is denoted by $T_A$, the number $T_O$ of the remaining tracks at the point A is given by the equation of $T_O = T_M - T_A$.

Since $T_O$ approximately corresponds to $\triangle ADA_X$, $$T_O \approx A_Y(D_X - A_X)/2$$

If a deceleration factor Kn which is dominant between the points A and D is read from the data map as an estimated deceleration factor for example by designating the frame number Fn of a middle point between the points A and B, the following equation can be obtained:

$$Kn \approx A_Y/(D_X - A_X)$$

Therefore, substitution of the term in the parentheses of the equation of $T_O$ by the above equation yields equations of:

$$T_O = A_Y^2/2Kn, \quad A_Y^2 = 2KnT_O$$

This indicates that convergence to the target frame number in the acceleration and deceleration regions is possible if the transition to the deceleration region is performed when the difference $T_D$ between the total number $T_M$ of tracks traversed in the acceleration and deceleration regions and the total number $T_A$ of tracks traversed up to the present position satisfies the relation of $T_D \geq T_O$, or when the present speed $A_Y$ of the slider satisfies the relation of $A_Y \geq \sqrt{2KnT_O}$.

Figure 17:
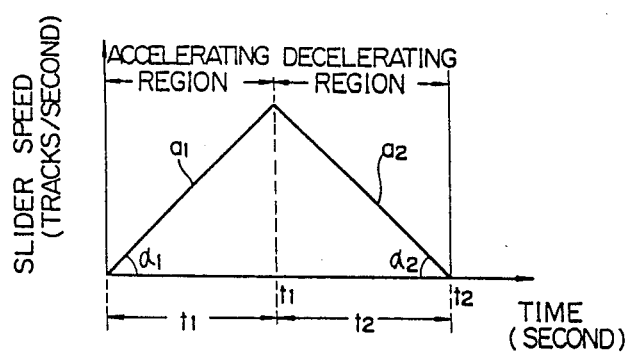
FIGS. 17 through 19 are explanatory diagrams for showing other examples of the high-scanning subroutine.

The other example of the high-scanning subroutine will be explained with reference to FIG. 17. The purpose of this control method is to reduce the time required for stabilizing the slider by performing the speed control for adjusting the deceleration factor in the decelerating period to an ideal deceleration factor thereby smoothly performing the transition from the decelerating period to the constant-speed region. In FIG. 17, the time period of searching operation can be reduced by decreasing the time period $t_1$ of the accelerating period, and the time period $t_2$ of the decelerating period. In order to attain such a reduction, it is necessary to increase acceleration factors $a_1$ and $a_2$ so as to increase the driving force and braking force of the slider. However, an angle of incidence $\alpha_2$ to the target frame number also increases as a consequent.

Figure 18:
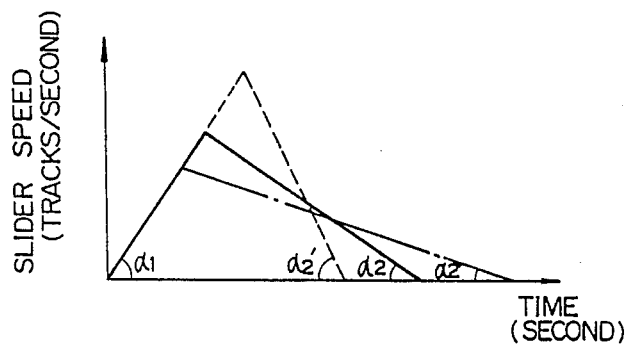

As illustrated in FIG. 18, if the angle of incidence $\alpha_2$ is small, then the search time becomes long. On the other hand, if the angle of incidence $\alpha_2$ is large, then an inversion of the direction of movement of the slider or the like occurs, to generate such an osciallation state as shown in FIG. 13. As a result, the precision of the of slider arrival position is lowered and the time required for the stabilization is prolonged.

Figure 19:
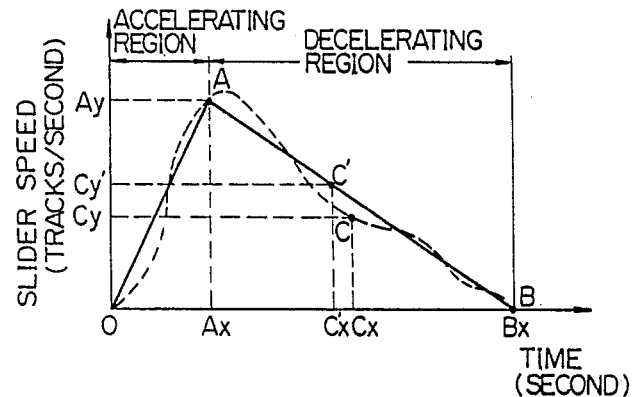

Therefore, in this control method, is it desirable that the open control by which the driving forth of the slider motor 14 is optimally utilized is adopted in the acceleration region, and in the deceleration region, the speed of the slider 3 is adjusted so that the deceleration factor is maintained at a maximum ideal deceleration factor on and under which the speed of movement is prevented from changing in an oscillating manner, as illustrated in FIG. 19.

Figure 20:
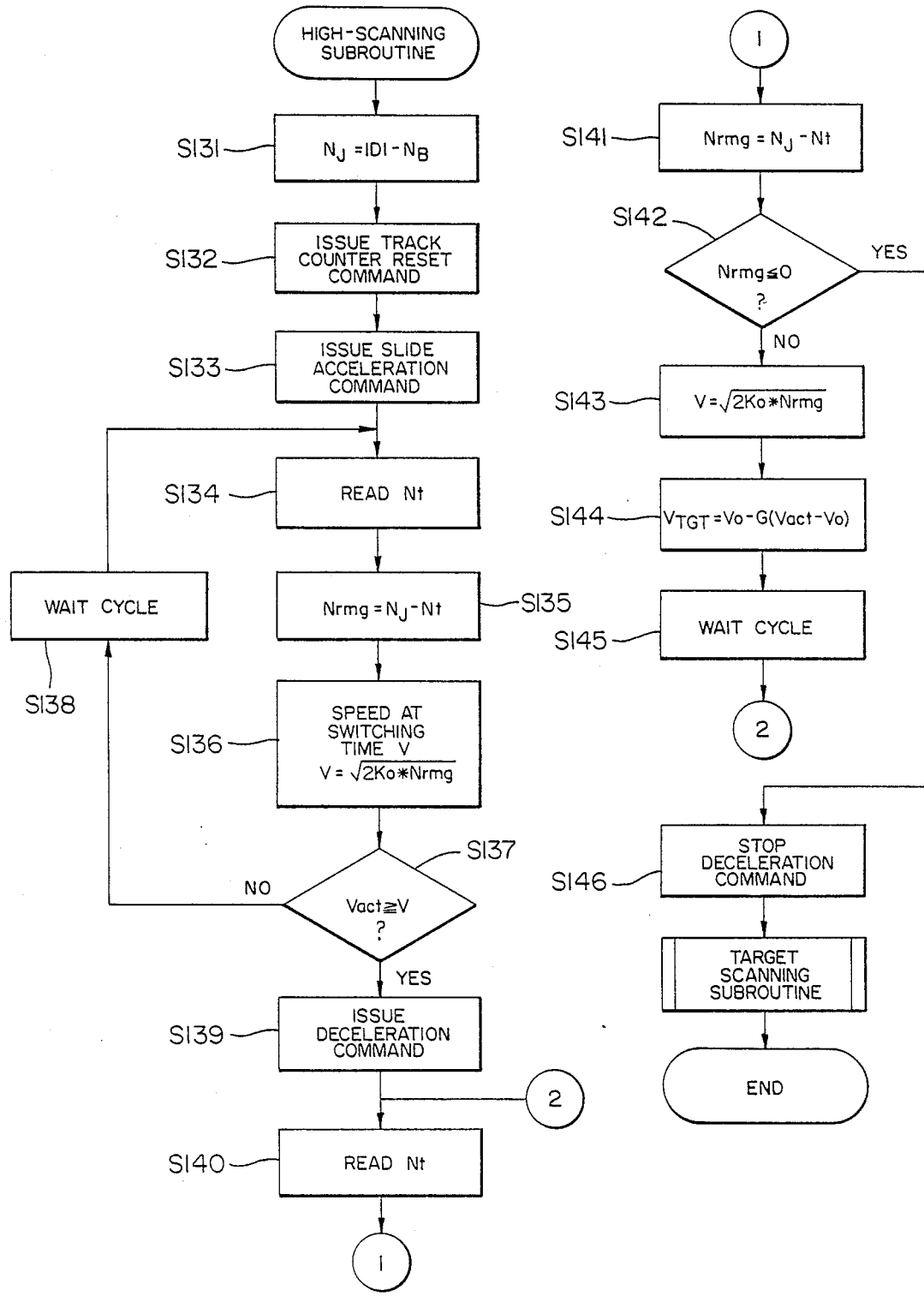
FIG. 20 is a flowchart for explaining a control procedure in another example of the high-scanning subroutine.

The steps of this control procedure will be explained with reference to FIG. 20. At first, an ideal deceleration factor $K_O$ which is determined in consideration of a dynamic characteristic of the drive system of the slider is stored in FIG. 20.

When the high-scanning subroutine is selected in the step S29 shown in FIG. 2, an open control subroutine using this deceleration factor table is executed.

In this subroutine, the number of tracks to be traversed by the slider in the acceleration and deceleration regions is calculated by subtracting from the distance D the track number $N_B$ in the aforementioned constant speed region and the conversion region, at a step 131. For example, the number of tracks obtained by subtracting 3600 tracks (18 K track/second × 200 ms) from the total track number is determined as the track number Nj of the acceleration and deceleration regions which represents the number of tracks to be traversed by the information detection light spot in the acceleration and deceleration regions. After the step 131, a reset command for the track counter 10 is issued at a step 132. Then, a command of the slider acceleration is supplied to the motor control circuit 12 at a step 133. In response to this command, the motor control circuit 12 produces a maximum output, for example, to start the movement of the slider 3. Then the accumulated value Nt of the track counter 10 is read at a step S134, and the number Nrmg of the remaining tracks is calculated by subtracting the number Nrmg from the number Nj, at a step S135. Then, at a step S136, substitution of the accumulated value Nt of the counter and the deceleration factor $K_O$ stored in the memory in the above mentioned discriminant $A_Y \geq \sqrt{2KT_O}$ is performed, to calculate the speed V at the time of switching. At the next step S137, judgment is made as to whether or not the present speed Vact has exceeded the speed V at the time of switching. If the answer is negative, the program goes back to the step S134 through a step S138 of wait cycle having sampling intervals of 0.5 ms, to repeat the operations of the steps S134 through S137. If the answer at the step 137 is affirmative, the acceleration command is canceled, and the deceleration command is issued at a step S139. Then the integration value Nt and the track number Nj in the acceleration and deceleration regions are read at a step 140, and the remaining track number Nrmg is calculated at a step S141. Then, for example, the remaining track number Nrmg is equal to 0 or below is detected at a step S142. If the answer is affirmative at the step S142, the supply of the deceleration command is stopped at a step S146, and program shifts to the target-scanning subroutine which was already described. If, on the other hand, the answer at the step S142 is negative, an ideal present speed $V_O$ is calculated from the number Nrmg of the remaining tracks, and the deceleration factor $K_O$, at a step S143. Then, a target speed $V_{TGT}$ of the speed servo is calculated by using an equation of $V_{TGT}=V_O-(V_{act}-V_O)\times G$, at a step S144, in which G represents the gain of the speed servo circuit. A speed setting signal corresponding to this target speed $V_{TGT}$ is subsequently supplied to the motor control circuit 12 to control the speed of the slider 3, at the step S144. After the step S144, the program goes back to the step S140 through a step S145 of wait cycle of 0.5 ms, to repeat the operations of the steps S140 through S145. Thus, a variable value control is performed so that the speed control is performed to cause the deceleration factor in the deceleration region to follow the ideal deceleration factor $K_O$.

With this control method, there is an advantage that the slider is stabilized in a short time because the transition to the constant speed stage is attained with a a proper ideal deceleration factor without passing through the constant speed servo locking subroutine.

In addition, it is also possible to determine the ideal deceleration factor $K_O$ as a function of the number of tracks, in such a manner that the factor $K_O$ becomes larger as the number Nrmg increases and the factor $K_O$ has a value for the smooth lock-in of the constant speed subroutine only when the number Nrmg is small.

In the case of CAV discs, there is a correspondence between frame numbers of the address data and track numbers. On the other hand, in CLV discs, the playing time from a start point to the present address is recorded as the address data in the form of time codes. Therefore, in the case of the CLV disc, the number of tracks is calculated from the time code. A method for the calculation is disclosed, for example, in Japanese Patent Application Laid Open No. 59-57873. Assume that the radius of the innermost track is denoted by $r_O$, the speed of rotation at this radius is denoted by $N_O$, the track pitch is denoted by P, and the distance of a track being played at a time t is denoted by r, the distance r of the present track from the center of disc is given by equation of:

$$r=\sqrt{r_O^2+P\cdot N_O\cdot t(P+2r_O)}$$

The distance $D_R$ from the present address to the target address is given by the equation of:

$$D_R=|\sqrt{r_O^2+P\cdot N_O\cdot t_1(P+2r_O)}-\sqrt{r_O^2+P\cdot N_O\cdot t_0(P+2r_O)}|$$

where $t_0$ and $t_1$ respectively represent time codes at the present address and the target address.

Also, the number of tracks from the present address to the target address is given by an equation of $D_p=D_R/P$. The track pitch can be obtained by a track pitch measuring program executed by the MPU.

Thus, when the determination of the CLV disc is performed in an initial period of playing operation, programs of calculating the number of tracks and the track number and so on are suitably executed, to perform the high-speed search operation according to the present invention.

In addition, it is possible to arrange that the functions of the demodulation circuit 5, the track counter 10, and the motor control circuit 12 are performed by the MPU. Moreover, although an electromagnetic braking is adopted in the described example, it is also possible to adopt a mechanical braking. In addition, the detection of the speed of the slider is performed in the described example by the count operation on the basis of the change in the accumulated value in the track counter. However, the use of this method is not limitative, and it is also possible to employ an arrangement in which magnetic markers provided in the path of the slider 3 are sensed by a pickup coil. Otherwise, it is also possible to employ an arrangement for sensing the speed of the slider in which optical markers in the path of the slider are read by means of an optical sensor. Furthermore, it is also conceivable to employ an acceleration sensor.

As explained in the foregoing description, the high-speed search method for a disc player according to the present invention features the selective execution of the accelerating and decelerating move control mode and the constant speed move control mode depending on the distance from the present address to the target address. Therefore, appropriate search operations are always performed so that a rapid random access operation is realized.

In addition, according to another feature of the invention, the high-speed search method is provided with the stage of constant-speed movement in which the slider is moved at a relatively high constant speed within the range in which the address data can be obtained, after the accelerating-and-decelerating stage in which the slider is accelerated to a high speed, and subsequently decelerated to a predetermined speed. Therefore, it is possible to accurately move the slider near to the target address at high speeds. The fine adjustment is performed in the vicinity of the target address. By these features, an advantageous effect is obtained that an accurate and rapid random access operation is realized even if the distance to the target address is quite long.

According to a further feature of the present invention, the accumulated value in the track counter for accumulating the number of tracks traversed by the slider is renewed by the address data each time the address data is demodulated, and the present address is determined by using the renewed accumulated value of the track counter. Hence, it is unnecessary to read the address data for each track, and the speed of movement of the slider can be set at a high speed. On the other hand, the count error of the track counter is eliminated each time the renewal of the accumulated by the address data is performed. Thus, it is quite advantageous that lowering of the accuracy in determining the present address is surely prevented.

Furthermore, in another feature of the present invention, the stop distance corresponding to the present speed of the slider is obtained by searching, and the remaining distance is corrected by a part corresponding to the above mentioned stop distance when the start time of the application of the braking force is determined in accordance on the basis of the remaining distance. Thus, it is advantageous that the determination is performed in consideration of the movement of the slider by the inertial force, to prevent the slider from overrunning.

Moreover, in a still further feature of the present invention, the slider is rapidly moved to traverse the tracks by the accelerating stage in which the slider is accelerated to a high speed and the decelerating stage in which the slider is decelerated, and the speed control is performed so that the deceleration factor in the above mentioned decelerating stage approaches to the ideal decelerating factor of a constant value or the deceleration factor approaches to the ideal deceleration factor in a manner corresponding to the decrease in the number of the remaining tracks. Thus, it is quite advantageous that the rapid random access operation is realized and a good stabilization characteristic of the slider is obtained.

What is claimed is:

1. A high-speed search method for searching a target address and for use in a disc player system having a slider for positioning a pickup for reading an information signal recorded on a disc as tracks, in a disc radius, and a tracking servo system for causing an information detecting point of said pickup to follow the track, said method comprising the steps of:

preparing an accelerating-and-decelerating move control mode in which said slider is accelerated and subsequently decelerated with said tracking servo loop open, and a constant speed move control mode in which said slider is moved at a constant speed by using address data obtained from a signal from said pickup;

detecting a distance from a present position of said pickup to said target address; and executing operations of said accelerating-and-decelerating move control mode and subsequently said constant speed move control mode and closing said tracking servo loop when said distance is equal to or greater than a predetermined value, and executing said operation of said constant speed moe control mode without executing said operation of said accelerating-and-decelerating move control mode and closing said tracking servo loop when said distance is smaller than said predetermined value.

2. A high-speed search method for searching a target address and for use in a disc player system having a slider for positioning a pickup for reading an information signal recorded on a disc as tracks, in a disc radius, and a tracking servo system for causing an information detecting point of said pickup to follow the track, said method comprising:

a first step for detecting an initial track on which said pickup is located;

a second step for setting a temporary target track which is nearer to a present track than a final target track carrying target address data by a predetermined number of tracks for convergence, from said initial track;

a third step for opening a servo loop of said tracking servo system and accelerating said slider toward said temporary target track;

a fourth step for calculating the number of remaining tracks up to said temporary target track by using the number of traversed tracks obtained by counting tracks traversed by said pickup;

a fifth step for estimating a change in the speed of said slider when said slider travels across said remaining tracks with a decelerating movement, and applying a braking force to said slider to cause the decelerating movement so that said change in the speed of said slider falls in a desired manner of speed change;

a sixth step for stopping the application of said braking force to start a constant speed movement of said slider when said number of said remaining tracks falls below a predetermined value or when said speed of said slider is reduced to be lower than a predetermined speed;

a seventh step for reading address data at a present position of said slider and generating a corrected number of traversed tracks by correcting said number of traversed tracks by said address data; and an eighth step for stopping the movement of said slider and closing said tracking servo loop when a difference between said corrected number of traversed tracks and said final target track becomes smaller than a predetermined value.

3. A method as set forth in claim 2, wherein said fifth step is adapted that a deceleration factor in said desired manner of speed change is gradually decreased.

4. A method as set forth in claim 3, further comprising a ninth step for causing said slider to perform jump operations until said address data obtained from said pickup becomes identical with said target address.

5. A method as set forth in claim 4, wherein said fifth step is adapted that a deceleration factor in said desired manner of speed change is gradually decreased.

6. A high-speed search method for searching a target address and for use in a disc player system having a slider movable along a radius of a disc carrying information including address information, a pickup mounted on said slider for reading said information and generating an electric signal, a data demodulator for demodulating address data from said electric signal, and a slider movement controller for controlling the movement of said slider, said method comprising the steps of:

renewing an accumulated value representing the number of tracks traversed by said pickup on the basis of address data of a predetermined number of digits while moving said slider at a speed in a range in which said address data can be obtained at said data demodulator; and determining a present address at which the pickup is located on the basis of a renewed accumulated value obtained by said renewing step.

7. A high-speed search method for searching a target address and for use in a disc player system having a slider carrying a pickup for reading a signal on a disc carrying information including address information, and disposed to be movable in a disc radius and positioned by a drive motor, said method comprising the steps of:

obtaining previously data of a stop distance required for stopping said slider by applying a braking force to said drive motor for each speed of said slider at a time of starting of the application of said braking force;

moving said slider toward a target track bearing said target address;

accumulating the number of tracks traversed by said pickup by means of said signal from said pickup;

obtaining a position of a present track at which said pickup is located and the number of remaining tracks from said present track to said target track, on the basis of an accumulated number of tracks;

detecting a present speed of said slider and searching the number of tracks for stopping at the present speed of the slider from said data of said stop distance; and applying said braking force to said drive motor to decelerate said slider when said number of remaining tracks and said number of tracks for stopping searched out become identical with each other.

8. A method as set forth in claim 7, wherein said data of said stop distance are given as the number of tracks traversed by said slider from the start of application of said braking force to a stoppage of said slider.

9. A high speed search method for searching a target address for use in a disc player including a slider carrying a pickup for reading a signal from a disc carrying information including address information, and disposed to be movable in a disc radius and positioned by a drive motor, said method comprising the steps of:

accelerating said slider toward a target track bearing said target address, and accumulating the number of tracks traversed by said pickup by means of said signal from said pickup;

obtaining a position of a present track at which said pickup is located and the number of remaining tracks from said present track to said target track, on the basis of an accumulated number of tracks;

detecting a present speed of said slider;

calculating a speed of a switching time by using an ideal deceleration factor of said slider and said number of said remaining tracks;

applying a braking force to said drive motor to decelerate said slider when said present speed exceeds said speed of said switching time; and controlling said braking force so that an actual deceleration factor of said slider becomes identical with said ideal deceleration factor.

10. A method as set forth in claim 9, wherein said ideal deceleration factor has a constant value.

11. A method as set forth in claim 9, wherein said ideal deceleration factor is determined as a function of said number of said remaining tracks.

* * * * *